(12) United States Patent
Latta et al.

(10) Patent No.: US 8,782,567 B2
(45) Date of Patent: Jul. 15, 2014

(54) GESTURE RECOGNIZER SYSTEM ARCHITECTURE

(75) Inventors: Stephen G. Latta, Seattle, WA (US); Relja Markovic, Seattle, WA (US); Arthur Charles Tomlin, Redmond, WA (US); Gregory N. Snook, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 13/289,731

(22) Filed: Nov. 4, 2011

(65) Prior Publication Data

US 2012/0050157 A1 Mar. 1, 2012

Related U.S. Application Data

(63) Continuation of application No. 13/196,618, filed on Aug. 2, 2011, which is a continuation of application No. 12/422,661, filed on Apr. 13, 2009, now Pat. No. 7,996,793.

(60) Provisional application No. 61/148,866, filed on Jan. 30, 2009.

(51) Int. Cl.
| | |
|---|---|
| *G06F 3/048* | (2013.01) |
| *G06F 3/033* | (2013.01) |
| *A63F 13/00* | (2014.01) |
| *G06F 3/0488* | (2013.01) |

(52) U.S. Cl.
CPC ........... *G06F 3/04883* (2013.01); *G06F 3/033* (2013.01); *A63F 13/00* (2013.01)
USPC ............. 715/863; 715/784; 715/792; 463/36; 463/37; 345/156; 345/157

(58) Field of Classification Search
CPC ...... G06F 3/04883; G06F 3/033; A63F 13/00
USPC ............ 715/863, 784, 792; 463/36; 345/156, 345/157
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| (Continued) | | |

FOREIGN PATENT DOCUMENTS

| | | |
|---|---|---|
| CN | 101254344 B | 6/2010 |
| EP | 0583061 A2 | 2/1994 |
| (Continued) | | |

OTHER PUBLICATIONS

Yang et al., "Hidden Markov Model for Gesture Recognition," The Robotics Institute, Carnegie Mellon University, 1994, 1-23, downloaded at http://www.ri.cmu.edu/pub_files/pub3/yang_jie_1994_1.pdf.

(Continued)

*Primary Examiner* — Tadeese Hailu
(74) *Attorney, Agent, or Firm* — Judy Yee; Micky Minhas

(57) ABSTRACT

Systems, methods and computer readable media are disclosed for a gesture recognizer system architecture. A recognizer engine is provided, which receives user motion data and provides that data to a plurality of filters. A filter corresponds to a gesture, that may then be tuned by an application receiving information from the gesture recognizer so that the specific parameters of the gesture—such as an arm acceleration for a throwing gesture—may be set on a per-application level, or multiple times within a single application. Each filter may output to an application using it a confidence level that the corresponding gesture occurred, as well as further details about the user motion data.

20 Claims, 11 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,252,951 A | 10/1993 | Tannenbaum et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,183,365 B1 | 2/2001 | Tonomura et al. |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,249,606 B1 | 6/2001 | Kiraly et al. |
| 6,256,033 B1 | 7/2001 | Nguyen |
| 6,256,400 B1 | 7/2001 | Takata et al. |
| 6,266,057 B1 | 7/2001 | Kuzunuki et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,304,674 B1 | 10/2001 | Cass et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,567,536 B2 | 5/2003 | McNitt et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,929,543 B1 | 8/2005 | Ueshima et al. |
| 6,937,742 B2 | 8/2005 | Roberts et al. |
| 6,944,315 B1 | 9/2005 | Zipperer et al. |
| 6,950,534 B2 | 9/2005 | Cohen et al. |
| 7,003,134 B1 | 2/2006 | Covell et al. |
| 7,028,269 B1 | 4/2006 | Cohen-Solal et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,095,401 B2 | 8/2006 | Liu et al. |
| 7,098,891 B1 | 8/2006 | Pryor |
| 7,104,890 B2 | 9/2006 | Tsuda et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,274,800 B2 | 9/2007 | Nefian et al. |
| 7,308,112 B2 * | 12/2007 | Fujimura et al. .............. 382/103 |
| 7,317,836 B2 | 1/2008 | Fujimura et al. |
| 7,348,963 B2 | 3/2008 | Bell |
| 7,352,358 B2 | 4/2008 | Zalewski et al. |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |

(56) References Cited

U.S. PATENT DOCUMENTS

| | | |
|---|---|---|
| 7,492,367 B2 | 2/2009 | Mahajan et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,971,157 B2 | 6/2011 | Markovic et al. |
| 7,996,793 B2 | 8/2011 | Latta et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2002/0118880 A1 | 8/2002 | Liu et al. |
| 2003/0076367 A1 | 4/2003 | Bencze et al. |
| 2004/0068409 A1 | 4/2004 | Tanaka et al. |
| 2004/0193413 A1* | 9/2004 | Wilson et al. ............ 704/243 |
| 2005/0025242 A1 | 2/2005 | Ma et al. |
| 2005/0108322 A1 | 5/2005 | Kline et al. |
| 2006/0010400 A1* | 1/2006 | Dehlin et al. ............ 715/856 |
| 2006/0209021 A1 | 9/2006 | Yoo et al. |
| 2006/0209957 A1* | 9/2006 | Riemens et al. ......... 375/240.16 |
| 2007/0126874 A1 | 6/2007 | Kake |
| 2007/0159455 A1 | 7/2007 | Lin |
| 2007/0190506 A1 | 8/2007 | Jeng et al. |
| 2007/0259716 A1 | 11/2007 | Mattice et al. |
| 2007/0263932 A1 | 11/2007 | Bernardin et al. |
| 2007/0279494 A1* | 12/2007 | Aman et al. ............ 348/169 |
| 2008/0026838 A1 | 1/2008 | Dunstan et al. |
| 2008/0152191 A1 | 6/2008 | Fujimura et al. |
| 2008/0192005 A1 | 8/2008 | Elgoyhen et al. |
| 2008/0219502 A1 | 9/2008 | Shamaie |
| 2008/0221487 A1 | 9/2008 | Zohar et al. |
| 2008/0225041 A1* | 9/2008 | El Dokor et al. ........ 345/419 |
| 2008/0274804 A1* | 11/2008 | Harrison et al. ......... 463/29 |
| 2008/0285807 A1 | 11/2008 | Lee et al. |
| 2009/0017919 A1 | 1/2009 | Brennan |
| 2009/0027337 A1 | 1/2009 | Hildreth |
| 2009/0051648 A1 | 2/2009 | Shamaie et al. |
| 2009/0077504 A1* | 3/2009 | Bell et al. ............ 715/863 |
| 2009/0079813 A1 | 3/2009 | Hildreth |
| 2009/0082701 A1 | 3/2009 | Zohar et al. |
| 2009/0141933 A1 | 6/2009 | Wagg |
| 2009/0170604 A1 | 7/2009 | Mueller et al. |
| 2009/0184849 A1 | 7/2009 | Nasiri et al. |
| 2009/0198354 A1 | 8/2009 | Wilson |
| 2009/0221368 A1 | 9/2009 | Yen et al. |
| 2009/0228841 A1 | 9/2009 | Hildreth |
| 2009/0231278 A1 | 9/2009 | St. Hilaire et al. |
| 2009/0324008 A1 | 12/2009 | Kongqiao et al. |
| 2010/0203969 A1* | 8/2010 | Takahashi et al. ....... 463/32 |
| 2010/0214214 A1* | 8/2010 | Corson et al. .......... 345/158 |
| 2010/0266210 A1 | 10/2010 | Markovic et al. |
| 2011/0131005 A1* | 6/2011 | Ueshima et al. ......... 702/141 |
| 2012/0135805 A1* | 5/2012 | Miller, IV ............. 463/36 |
| 2012/0196660 A1* | 8/2012 | El Dokor et al. ........ 463/8 |

FOREIGN PATENT DOCUMENTS

| | | |
|---|---|---|
| JP | 08044490 A | 2/1996 |
| WO | WO 93/10708 A1 | 6/1993 |
| WO | WO 97/17598 A1 | 5/1997 |
| WO | WO 99/44698 A1 | 9/1999 |
| WO | WO 2009/059065 A1 | 5/2009 |

OTHER PUBLICATIONS

Ou et al., "Gesture Recognition for Remote Collaborative Physical Tasks using Tablet PCs," downloaded at http://research.microsoft.com/workshops/WOMTEC/WOMTEC_papers/WOMTEC_129.pdf, on Dec. 4, 2008, 8 pages.

PCT Application No. PCT/US2010/020797: International Search Report and Written Opinion of the International Searching Authority, Aug. 27, 2010, 8 pages.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

"Virtual High Anxiety", Tech Update, Aug. 1995, pp. 22.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "CONDENSATION—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

(56) References Cited

OTHER PUBLICATIONS

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

* cited by examiner

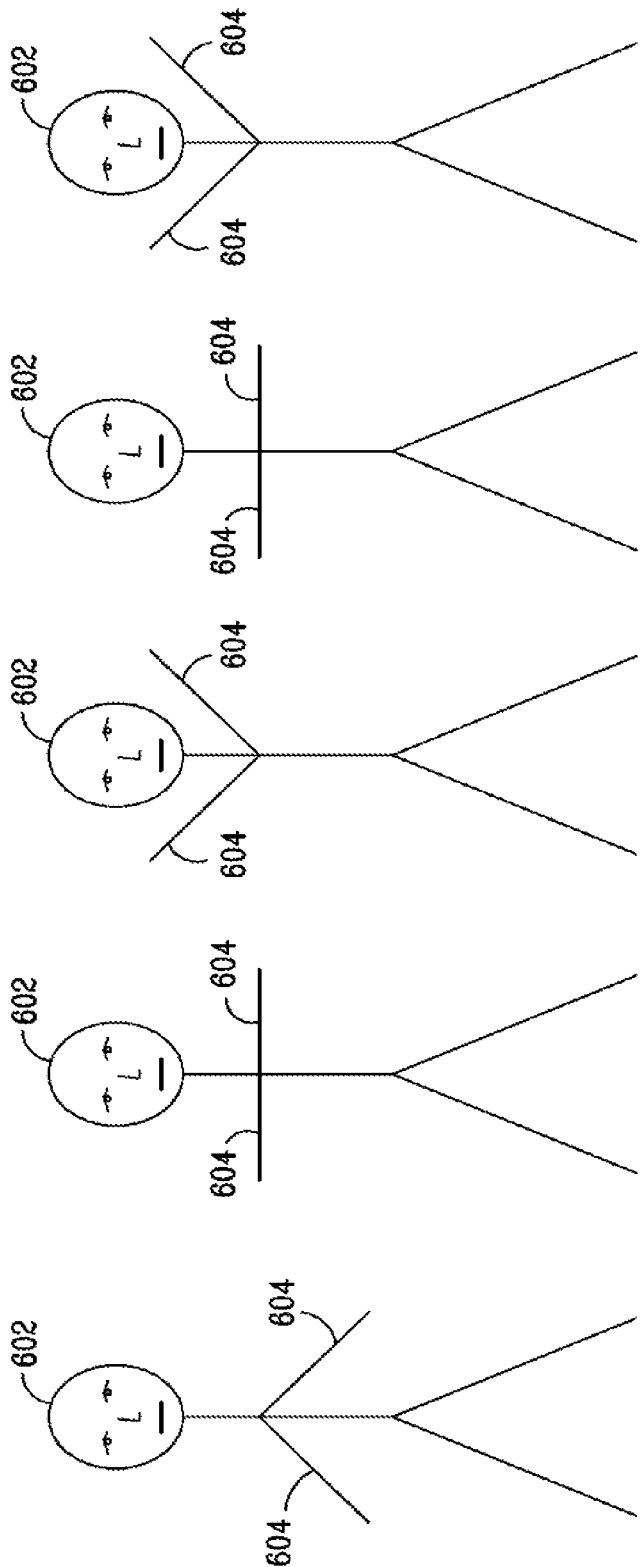

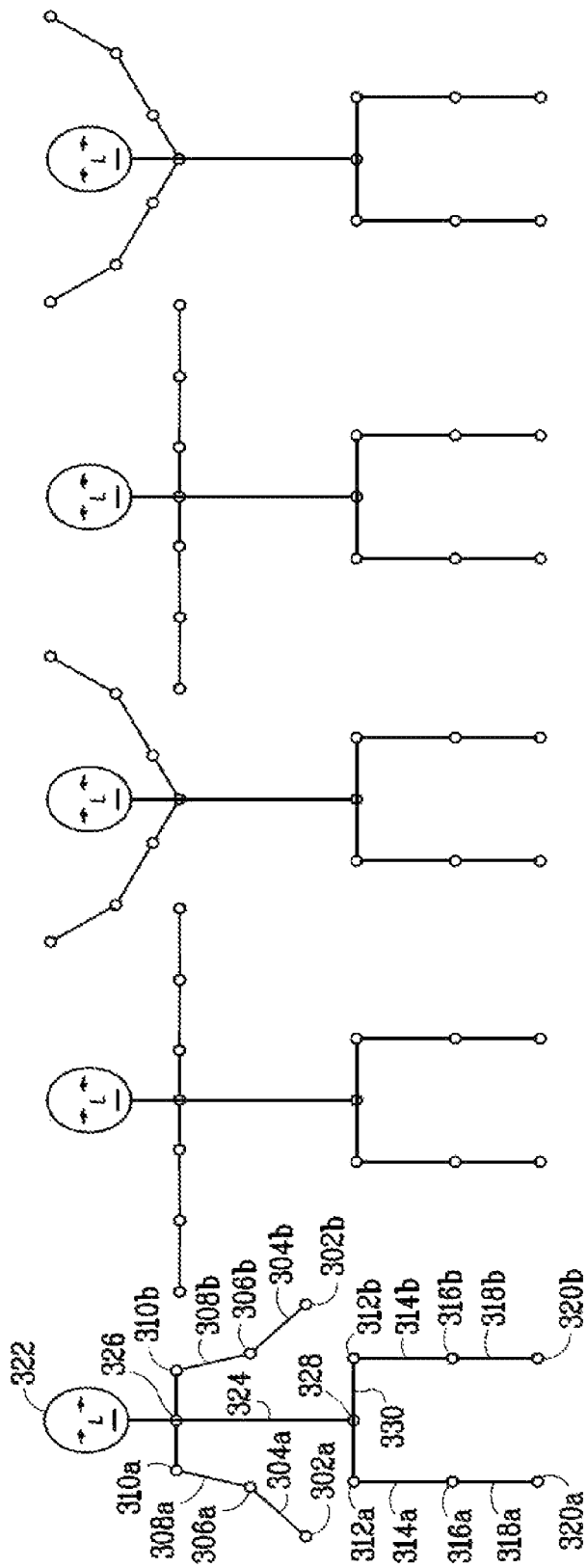

GESTURE RECOGNIZER SYSTEM ARCHITECTURE

CROSS REFERENCE TO RELATED APPLICATIONS

This application is a continuation of U.S. patent application Ser. No. 13/196,618, filed Aug. 2, 2011, which is a continuation of U.S. patent application Ser. No. 12/422,661, filed Apr. 13, 2009, which also claims the benefit under 35 U.S.C. §119(e) to U.S. Application No. 61/148,866, titled "Gesture Recognizer System Architecture," filed Jan. 30, 2009, the contents of which are incorporated herein in its entirety.

BACKGROUND

Many computing applications such as computer games, multimedia applications, office applications or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for receiving data reflecting skeletal movement of a user, and determining from that data whether the user has performed one or more gestures. A gesture recognizer system architecture is disclosed from which application developers can incorporate gesture recognition into their applications.

In an embodiment, a recognizer engine comprises a base recognizer engine and at least one filter. A filter comprises a information about a gesture and may comprise at least one corresponding parameter. The recognizer engine provides to an application a filter and receives from that application at least one parameter that specifies the particulars of how that gesture is to be recognized by the recognizer engine.

The recognizer engine receives a series of image data from a camera. This camera may comprise a color camera (such as red-green-blue or RGB), a depth camera, and a three-dimensional (3D) camera. This data may comprise separate depth and color images, a combined image that incorporates depth and color information, or a parsed image where objects are identified, such as people that are skeletal mapped. This data captures motions or poses made by at least one user. Based on this image data, the recognizer engine is able to parse gestures that the user intends to convey. The recognizer engine detects that the likelihood that the user has conveyed a gesture, and that the user has satisfied any parameters, either default or application-determined, associated with the gesture for the application. The recognizer engine then sends the confidence level that this has occurred to the application. In sending this confidence level, the recognizer engine may also send the application specifics of how the user conveyed the gesture for further processing by the application.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for a gesture recognizer system architecture in accordance with this specification are further described with reference to the accompanying drawings in which:

FIGS. 6A, 6B, 6C, 6D, and 6E illustrates an example gesture that a user 502 may make to signal for a "fair catch" in football video game.

FIGS. 7A, 7B, 7C, 7D, and 7E illustrates the example "fair catch" gesture of FIGS. 5A and 5B as each frame of image data has been parsed to produce a skeletal map of the user.

DETAILED DESCRIPTION OF ILLUSTRATIVE EMBODIMENTS

As will be described herein, a user may control an application executing on a computing environment such as a game console, a computer, or the like by performing one or more gestures. According to one embodiment, the gestures may be received by, for example, a capture device. For example, the capture device may capture a depth image of a scene. In one embodiment, the capture device may determine whether one or more targets or objects in the scene corresponds to a human target such as the user. To determine whether a target or object in the scene corresponds a human target, each of the targets may be flood filled and compared to a pattern of a human body model. Each target or object that matches the human body model may then be scanned to generate a skeletal model associated therewith. The skeletal model may then be provided to the computing environment such that the computing environment may track the skeletal model, render an avatar associated with the skeletal model, and may determine which controls to perform in an application executing on the computer environment based on, for example, gestures of the user that have been recognized from the skeletal model. A gesture recognizer engine, the architecture of which is described more fully below, is used to determine when a particular gesture has been made by the user.

Figure 1A:
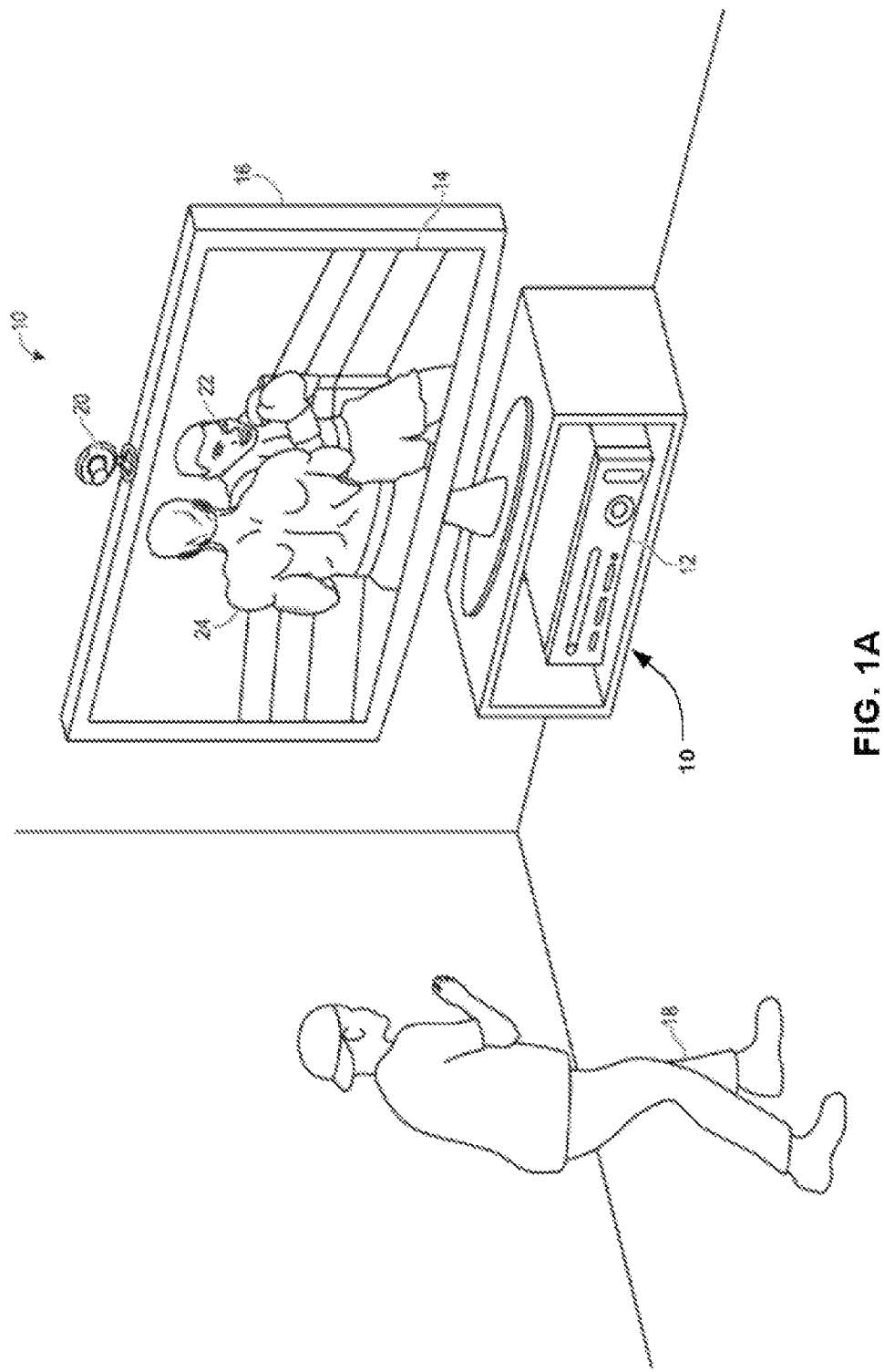
FIGS. 1A and 1B illustrate an example embodiment of a target recognition, analysis, and tracking system with a user playing a game.
Figure 1B:
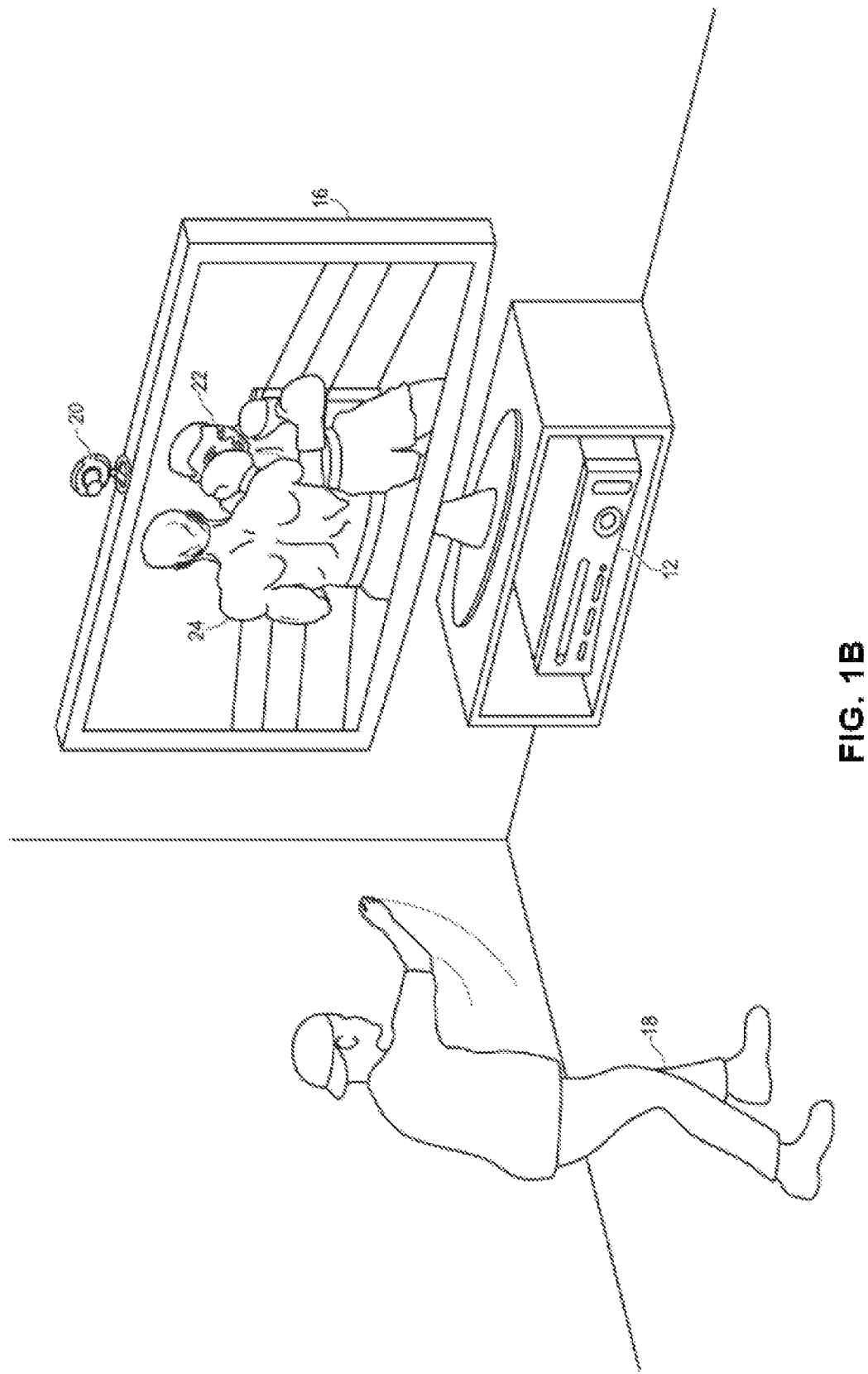

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 24. For example, the player may use movements to end, pause, or save a game, select a level, view high scores, communicate with a friend, etc.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
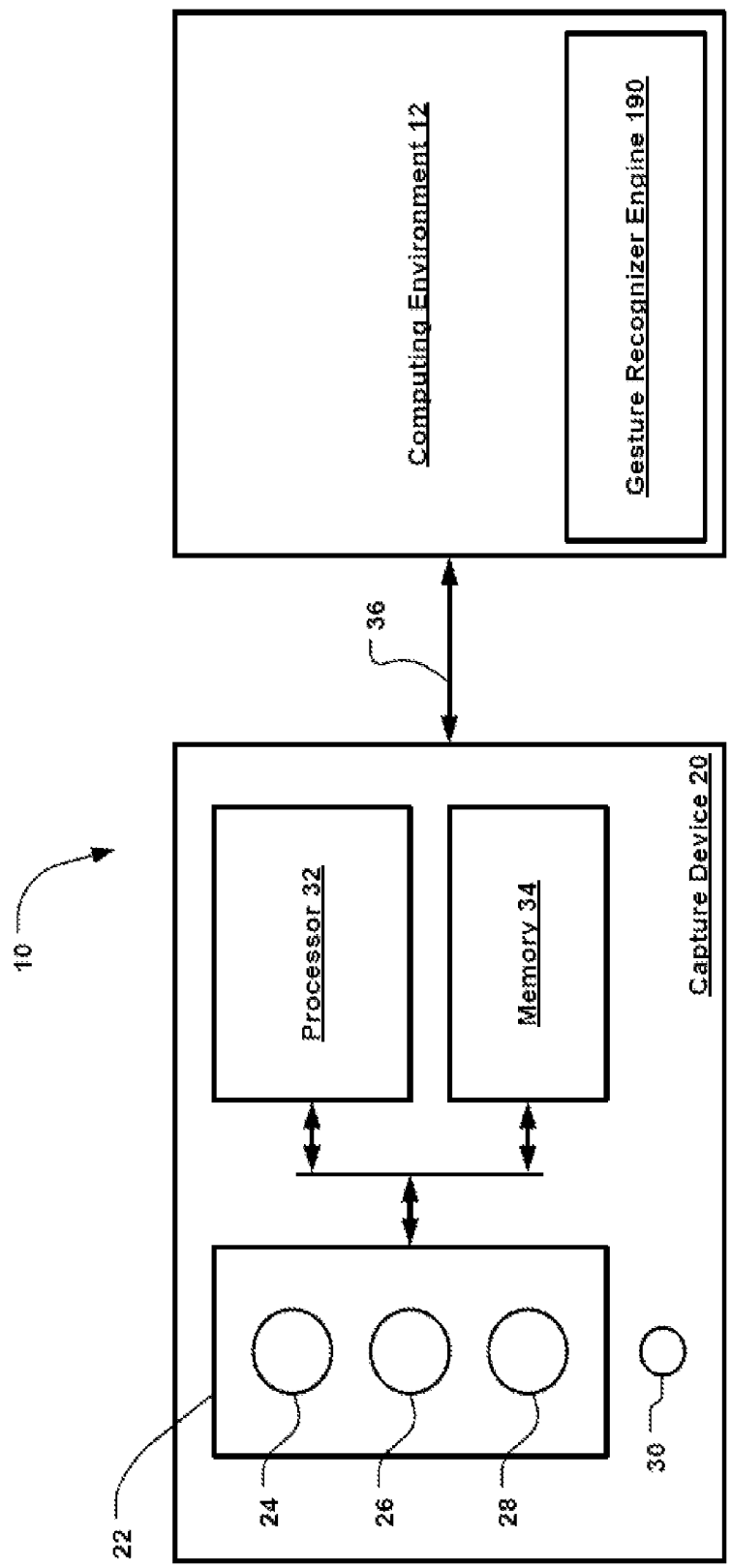
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, recognize user gestures and in response control an application such as a game or word processor. For example, as shown, in FIG. 2, the computing environment 12 may include a gestures recognizer engine 190. The gestures recognizer engine 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognizer engine 190 to identify when a user (as represented by the skeletal model) has performed one or more gestures. Those gestures may be associated with various controls of an application. Thus, the computing environment 12 may use the gesture recognizer engine 190 to interpret movements of the skeletal model and to control an application based on the movements.

Figure 3A:
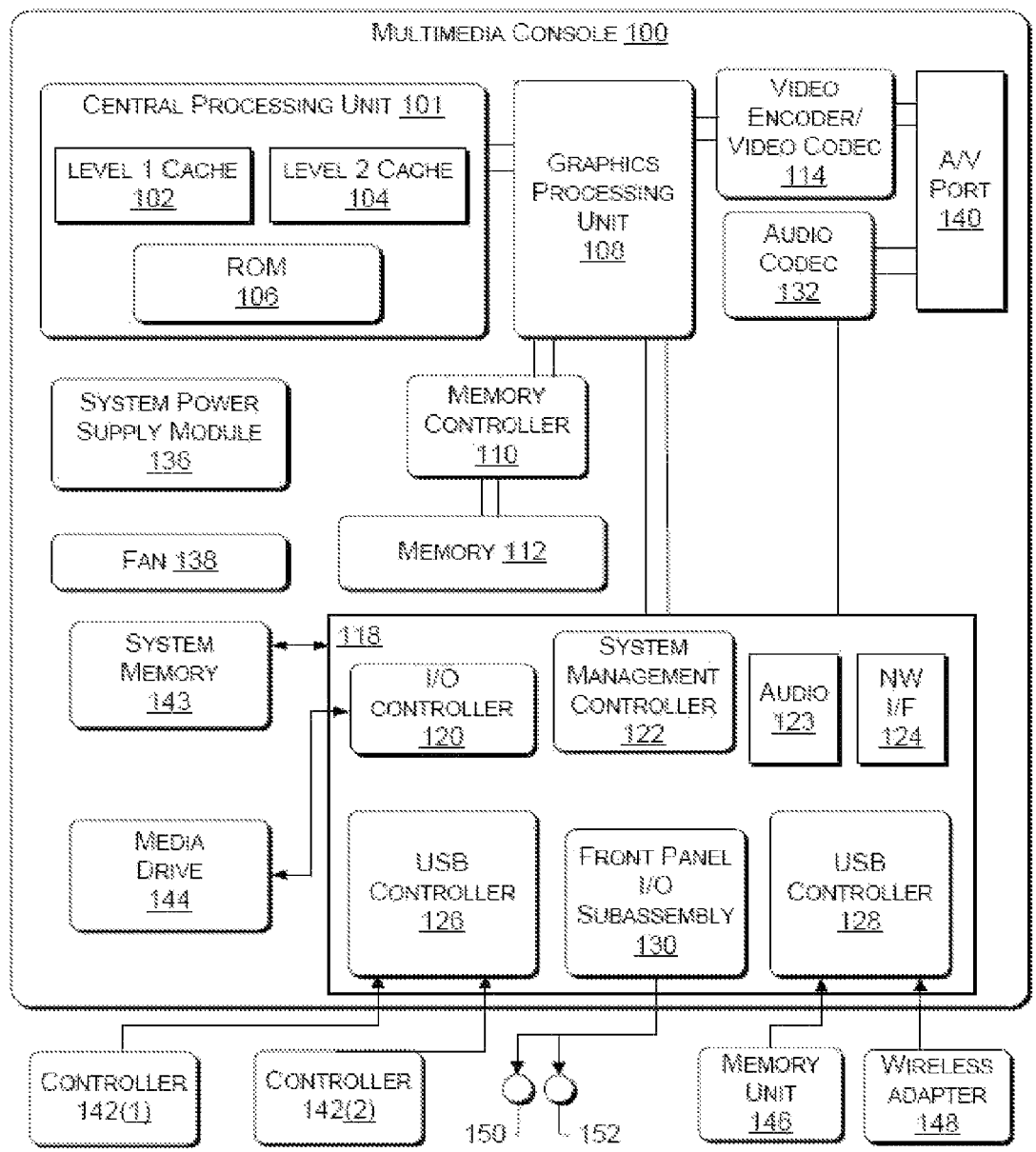
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 3B:
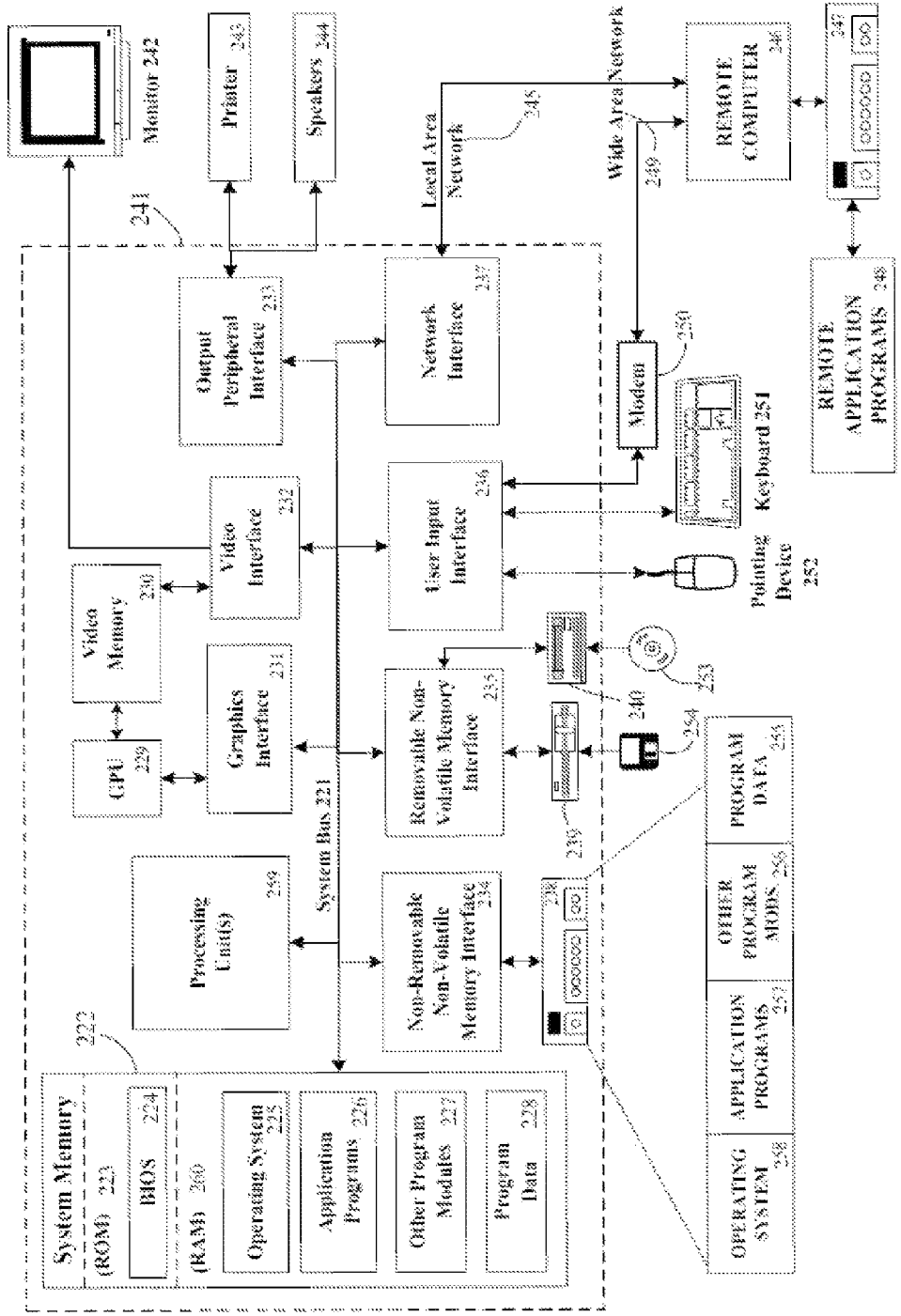
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4A:
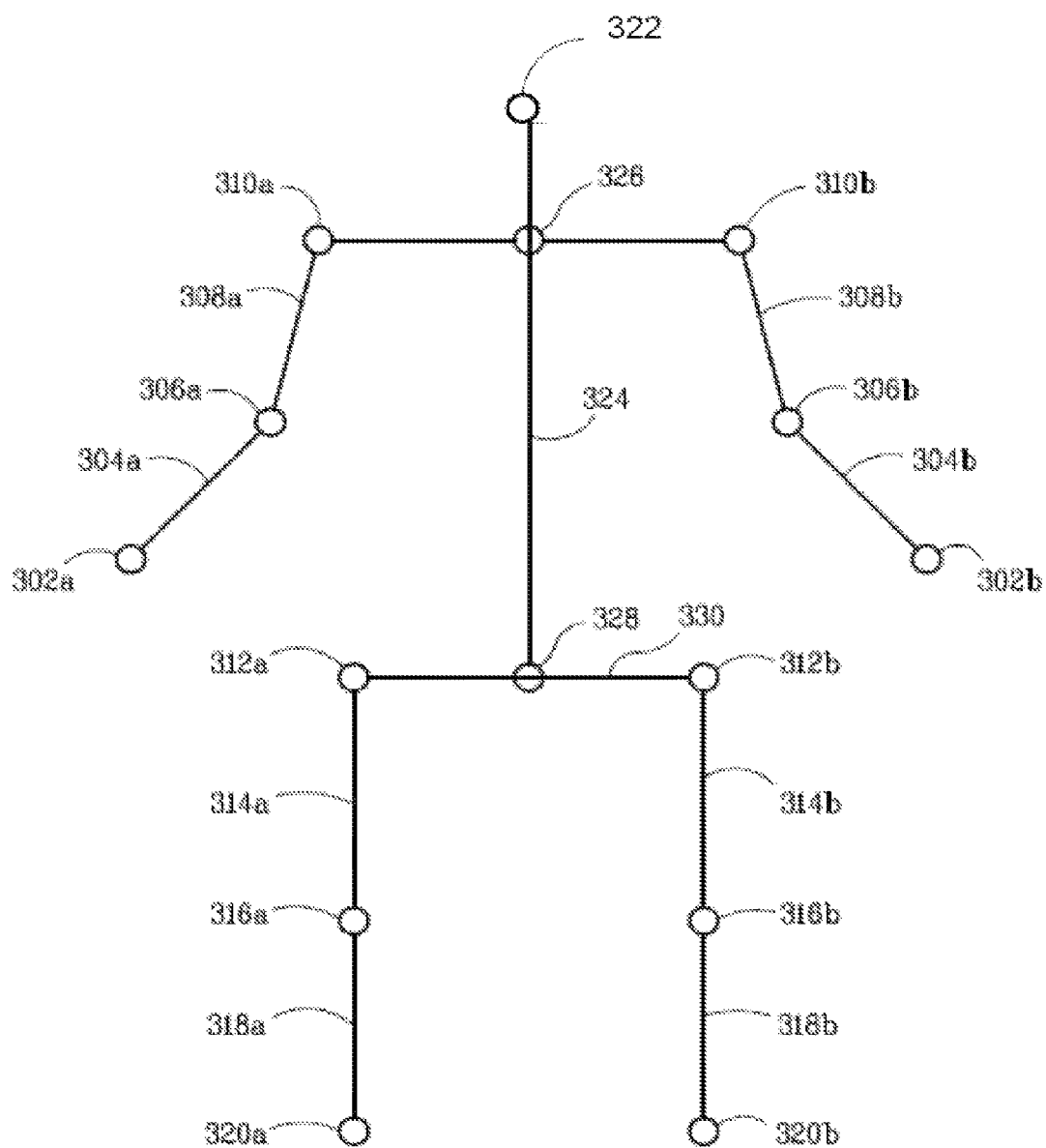
FIG. 4A illustrates a skeletal mapping of a user that has been generated from the target recognition, analysis, and tracking system of FIG. 2.

FIG. 4A depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and bottom 328 of the spine, and the waist 330. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning A gesture may be dynamic, comprising a motion, such as mimicking throwing a ball. A gesture may be a static pose, such as holding one's crossed forearms 304 in front of his torso 324. A gesture may also incorporate props, such as by swinging a mock sword. A gesture may comprise more than one body part, such as clapping the hands 302 together, or a subtler motion, such as pursing one's lips.

Gestures may be used for input in a general computing context. For instance, various motions of the hands 302 or other body parts may correspond to common system wide tasks such as navigate up or down in a hierarchical list, open a file, close a file, and save a file. Gestures may also be used in a video-game-specific context, depending on the game. For instance, with a driving game, various motions of the hands 302 and feet 320 may correspond to steering a vehicle in a direction, shifting gears, accelerating, and breaking.

A user may generate a gesture that corresponds to walking or running, by walking or running in place himself. The user may alternately lift and drop each leg 312-320 to mimic walking without moving. The system may parse this gesture by analyzing each hip 312 and each thigh 314. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 320 leave the ground entirely. The system may parse the skeleton for this gesture by analyzing the angle relation of the shoulders 310, hips 312 and knees 316 to see if they are in a position of alignment equal to standing up straight. Then these points and upper 326 and lower 328 spine points may be monitored for any upward acceleration. A sufficient combination of acceleration may trigger a jump gesture.

Given this "heel lift jump" gesture, an application may set values for parameters associated with this gesture. The parameters may include the above acceleration threshold, which determines how fast some combination of the user's shoulders 310, hips 312 and knees 316 must move upward to trigger the gesture, as well as a maximum angle of alignment between the shoulders 310, hips 312 and knees 316 at which a jump may still be triggered.

The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience. Where a gesture recognizer system is too sensitive, and even a slight forward motion of the hand 302 is interpreted as a throw, the user may become frustrated because gestures are being recognized where he has no intent to make a gesture, and thus, he lacks control over the system. Where a gesture recognizer system is not sensitive enough, the system may not recognize conscious attempts by the user to make a throwing gesture, frustrating him in a similar manner. At either end of the sensitivity spectrum, the user becomes frustrated because he cannot properly provide input to the system.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 302-310 to full length while making the grab gesture. In this situation, a similar grab gesture where the user only partially extends his arm 302-310 may not achieve the result of interacting with the ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 310a, and on the same side of the head 322 as the throwing arm 302a-310a. It may not be necessary to define all bounds of a volume, such as with this throwing gesture, where an outer bound away from the body is left undefined, and the volume extends out indefinitely, or to the edge of scene that is being monitored.

Figure 4B:
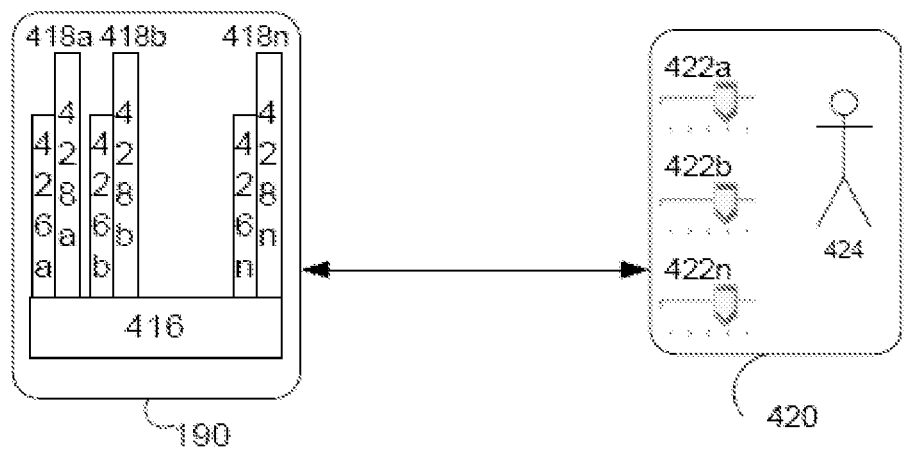
FIG. 4B illustrates further details of the gesture recognizer architecture shown in FIG. 2.

FIG. 4B provides further details of one exemplary embodiment of the gesture recognizer engine 190 of FIG. 2. As shown, the gesture recognizer engine 190 may comprise at least one filter 418 to determine a gesture or gestures. A filter 418 comprises information defining a gesture 426 (hereinafter referred to as a "gesture") along with parameters 428, or metadata, for that gesture. For instance, a throw, which comprises motion of one of the hands from behind the rear of the body to past the front of the body, may be implemented as a gesture 426 comprising information representing the movement of one of the hands of the user from behind the rear of the body to past the front of the body, as that movement would be captured by the depth camera. Parameters 428 may then be set for that gesture 426. Where the gesture 426 is a throw, a parameter 428 may be a threshold velocity that the hand has to reach, a distance the hand must travel (either absolute, or relative to the size of the user as a whole), and a confidence rating by the recognizer engine that the gesture occurred. These parameters 428 for the gesture 426 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 190 may have a base recognizer engine 416 that provides functionality to a gesture filter 418. In an embodiment, the functionality that the recognizer engine 416 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 418 are loaded and implemented on top of the base recognizer engine 416 and can utilize services provided by the engine 416 to all filters 418. In an embodiment, the base recognizer engine 416 processes received data to determine whether it meets the requirements of any filter 418. Since these provided services, such as parsing the input, are provided once by the base recognizer engine 416 rather than by each filter 418, such a service need only be processed once in a period of time as opposed to once per filter 418 for that period, so the processing required to determine gestures is reduced.

An application may use the filters 418 provided by the recognizer engine 190, or it may provide its own filter 418, which plugs in to the base recognizer engine 416. In an embodiment, all filters 418 have a common interface to enable this plug-in characteristic. Further, all filters 418 may utilize parameters 428, so a single gesture tool as described below may be used to debug and tune the entire filter system 418.

These parameters 428 may be tuned for an application or a context of an application by a gesture tool 420. In an embodiment, the gesture tool 420 comprises a plurality of sliders 422, each slider 422 corresponding to a parameter 428, as well as a pictoral representation of a body 424. As a parameter 428 is adjusted with a corresponding slider 422, the body 424 may demonstrate both actions that would be recognized as the gesture with those parameters 428 and actions that would not be recognized as the gesture with those parameters 428, identified as such. This visualization of the parameters 428 of gestures provides an effective means to both debug and fine tune a gesture.

FIG. 5 depicts more complex gestures or filters 418 created from stacked gestures or filters 418. Gestures can stack on each other. That is, more than one gesture may be expressed by a user at a single time. For instance, rather than disallowing any input but a throw when a throwing gesture is made, or requiring that a user remain motionless save for the components of the gesture (e.g. stand still while making a throwing gesture that involves only one arm). Where gestures stack, a user may make a jumping gesture and a throwing gesture simultaneously, and both of these gestures will be recognized by the gesture engine.

Figure 5A:
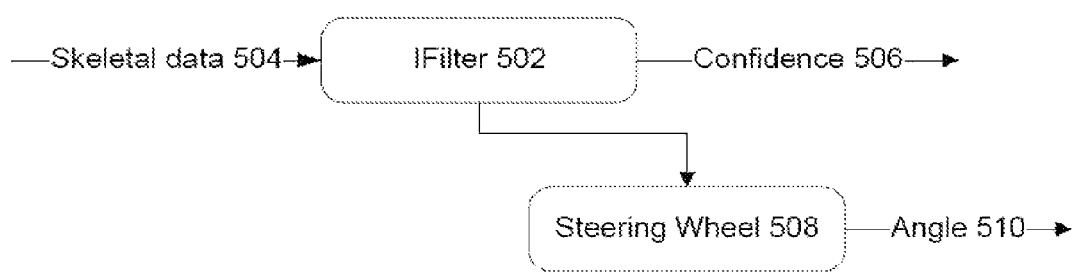
FIGS. 5A and 5B illustrates how gesture filters may be stacked to create more complex gesture filters.

FIG. 5A depicts a simple gesture filter 418 according to the stacking paradigm. The IFilter filter 502 is a basic filter 418 that may be used in every gesture filter. IFilter 502 takes user position data 504 and outputs a confidence level 506 that a gesture has occurred. It also feeds that position data 504 into a SteeringWheel filter 508 that takes it as an input and outputs an angle to which the user is steering (e.g. 40 degrees to the right of the user's current bearing) 510.

Figure 5B:
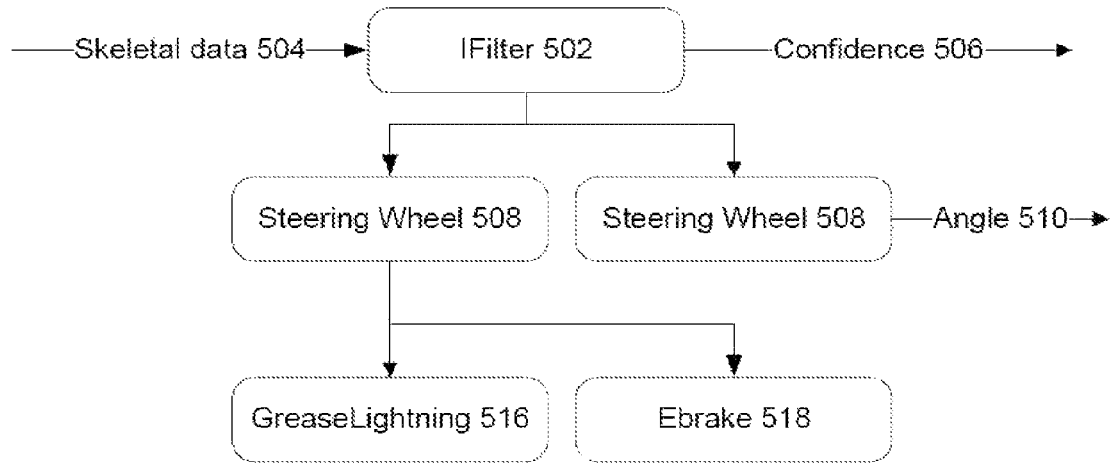

FIG. 5B depicts a more complex gesture that stacks filters 418 onto the gesture filter of FIG. 5A. In addition to IFilter 502 and SteeringWheel 508, there is an ITracking filter 512 that receives position data 504 from IFilter 502 and outputs the amount of progress the user has made through a gesture 514. ITracking 512 also feeds position data 504 to GreaseLightning 516 and EBrake 518, which are filters 418 regarding other gestures that may be made in operating a vehicle, such as using the emergency brake.

FIG. 6 depicts an example gesture that a user 602 may make to signal for a "fair catch" in a football video game. These figures depict the user at points in time, with FIG. 6A being the first point in time, and FIG. 6E being the last point in time. Each of these figures may correspond to a snapshot or frame of image data as captured by a depth camera 402, though not necessarily consecutive frames of image data, as the depth camera 402 may be able to capture frames more rapidly than the user may cover the distance. For instance, this gesture may occur over a period of 3 seconds, and where a depth camera captures data at 40 frames per second, it would capture 60 frames of image data while the user 602 made this fair catch gesture.

In FIG. 6A, the user 602 begins with his arms 604 down at his sides. He then raises them up and above his shoulders as depicted in FIG. 6B and then further up, to the approximate level of his head, as depicted in FIG. 6C. From there, he lowers his arms 604 to shoulder level, as depicted in FIG. 6D, and then again raises them up, to the approximate level of his head, as depicted in FIG. 6E. Where a system captures these positions by the user 602 without any intervening position that may signal that the gesture is cancelled, or another gesture is being made, it may have the fair catch gesture filter output a high confidence level that the user 602 made the fair catch gesture.

FIG. 7 depicts the example "fair catch" gesture of FIG. 5 as each frame of image data has been parsed to produce a skeletal map of the user. The system, having produced a skeletal map from the depth image of the user, may now determine how that user's body moves over time, and from that, parse the gesture.

In FIG. 7A, the user's shoulders 310, are above his elbows 306, which in turn are above his hands 302. The shoulders 310, elbows 306 and hands 302 are then at a uniform level in FIG. 7B. The system then detects in FIG. 7C that the hands 302 are above the elbows, which are above the shoulders 310. In FIG. 7D, the user has returned to the position of FIG. 7B, where the shoulders 310, elbows 306 and hands 302 are at a uniform level. In the final position of the gesture, shown in FIG. 7E, the user returns to the position of FIG. 7C, where the hands 302 are above the elbows, which are above the shoulders 310.

While the capture device 20 captures a series of still images, such that in any one image the user appears to be stationary, the user is moving in the course of performing this gesture (as opposed to a stationary gesture, as discussed supra). The system is able to take this series of poses in each still image, and from that determine the confidence level of the moving gesture that the user is making.

In performing the gesture, a user is unlikely to be able to create an angle as formed by his right shoulder 310a, right elbow 306a and right hand 302a of, for example, between 140° and 145°. So, the application using the filter 418 for the fair catch gesture 426 may tune the associated parameters 428 to best serve the specifics of the application. For instance, the positions in FIGS. 7C and 7E may be recognized any time the user has his hands 302 above his shoulders 310, without regard to elbow 306 position. A set of parameters that are more strict may require that the hands 302 be above the head 310 and that the elbows 306 be both above the shoulders 310 and between the head 322 and the hands 302. Additionally, the parameters 428 for a fair catch gesture 426 may require that the user move from the position of FIG. 7A through the position of FIG. 7E within a specified period of time, such as 1.5 seconds, and if the user takes more than 1.5 seconds to move through these positions, it will not be recognized as the fair catch 418, and a very low confidence level may be output.

Figure 8:
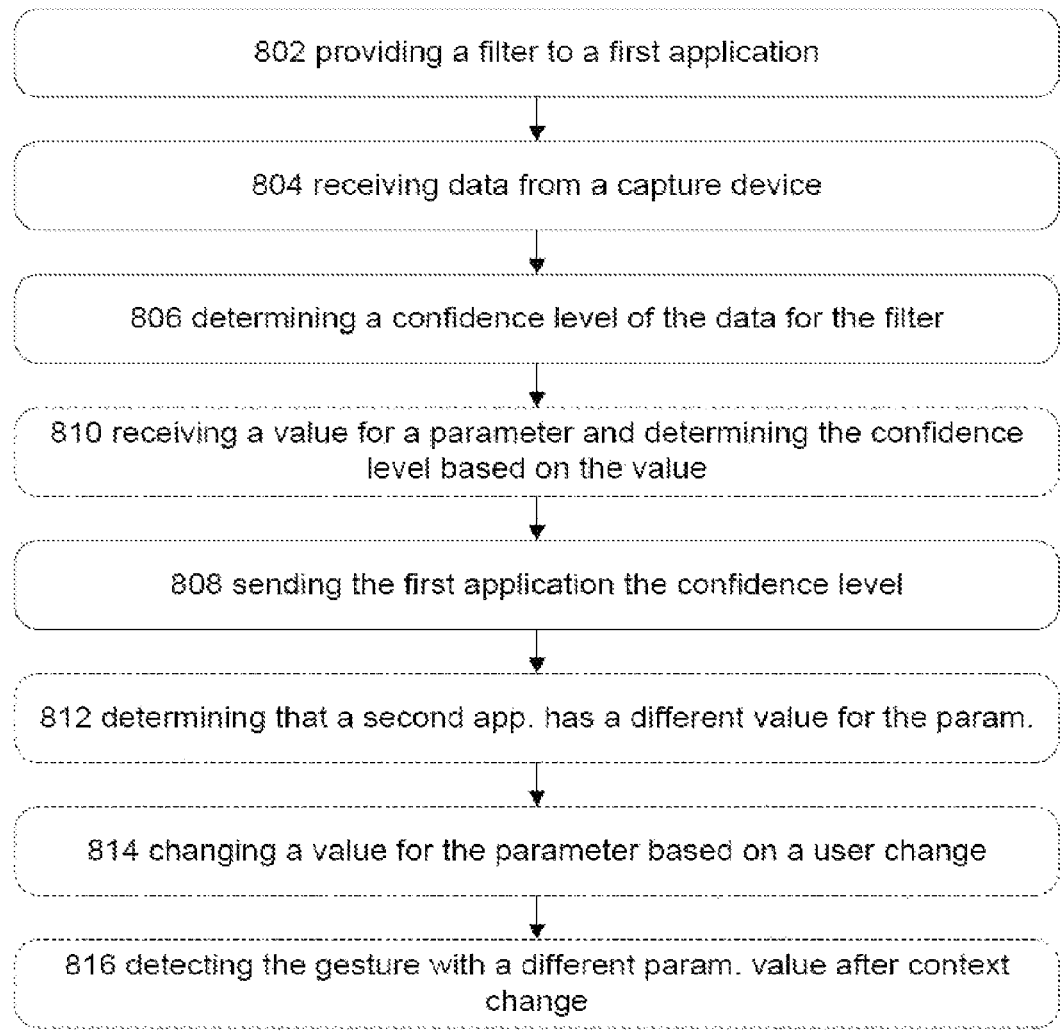
FIG. 8 illustrates exemplary operational procedures for using a gesture recognizer architecture to provide gestures to at least one application.

FIG. 8 depicts exemplary operational procedures for using a gesture recognizer architecture to provide gestures to at least one application of a plurality of applications.

Operation 802 depicts providing a filter representing a gesture to the first application, the filter comprising base information about the gesture. The gesture may comprise a wide variety of gestures. It may, for instance, be any of a crouch, a jump, a lean, an arm throw, a toss, a swing, a dodge, a kick, and a block. Likewise, the gesture may correspond to navigation of a user interface. For instance, a user may hold his hand with the fingers pointing up and the palm facing the depth camera. He may then close his fingers towards the palm to make a fist, and this could be a gesture that indicates that the focused window in a window-based user-interface computing environment should be closed.

As gestures may be used to indicate anything from that an avatar should throw a punch to that a window should be closed, a wide variety of applications, from video games to text editors may utilize gestures.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—are grouped together into genre packages. These packages are provided to an application, which may select at least one. The application may tune, or modify, the parameter of a gesture to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-person shooter, action, driving, and sports.

The parameter may vary based on the context the application is in. To that end, an application may assign a plurality of values to a parameter for a gesture, each value corresponding to a different context. As discussed supra, this context may be a cultural context or an environmental context.

In an embodiment, the application provides the gesture, which is used by the gesture recognizer engine. In the embodiment where each gesture comprises common inputs and outputs, the application may provide a gesture that adheres to those conventions, and communicate this gesture with the recognizer engine through an agreed-upon protocol.

Operation 804 depicts receiving data captured by capture device 20, as described above, the data corresponding to the first application. The data may correspond to the first application because that is the currently active application for which input is being generated.

Operation 806 depicts applying the filter to the data and determining an output from the base information about the gesture. In an embodiment, the output comprises a confidence level that the gesture corresponding to the filter has been performed. This confidence level may be output once, or it may be output continuously in response to received data. In an embodiment, this comprises determining a confidence level that the user has moved in such a way as to meet any requirements of the gesture (such as the hand being above the head) that are independent of any parameters. In an embodiment, this output may comprise a boolean determination as to whether the gesture corresponding to the filter occurred.

Where the filter comprises a parameter, the parameter may be a threshold, such as arm velocity is greater than X. It may be an absolute, such as arm velocity equals X. There may be a fault tolerance, such as arm velocity equals within Y of X. It may also comprise a range, such as arm velocity is greater than or equal to X, but less than Z. From the received data, the characteristics of that data that apply to the parameter may be determined, and then compared to the requirements of the parameter.

In an embodiment, the user also uses his voice to make, augment, distinguish or clarify a gesture. In this embodiment, operation 806 comprises receiving voice data and determining that a combination of the data and the voice data is indicative of the gesture. For instance, a user may be able to make a singing gesture by opening and closing his mouth, but also specify a specific note of that singing gesture by singing that note. Additionally, the user may be able to make a "strong punch" gesture as opposed to a "regular punch" gesture by shouting while making the otherwise "regular punch" gesture.

In an embodiment, the gesture may comprise a plurality of gestures. For instance, the user may be making the motions corresponding to moving to his side and discharging his firearm simultaneously. In this embodiment, it would be disfavored to limit the user to not discharging his firearm while he is moving, so multiple gestures made simultaneously by the user are detected.

Operation 808 depicts sending the first application the confidence level. In an embodiment, this may include sending the application a time or a period of time at which the gesture occurred. In another embodiment where the application desires time information, the application may use the time at which this indication that the gesture occurred is received as that time information. In an embodiment, this operation includes sending the application information about the characteristics of the gesture, such as a velocity of movement, a release point, a distance, and a body part that made the gesture. For instance, given a baseball video game where a pitcher may throw a pitch at any integer velocity between 50 mph and 105 mph, inclusive, and that velocity is based on the user's maximum arm velocity in making the gesture, it may be cumbersome to define a separate set of parameters for each of those 56 possible velocities. Instead, the application may be given an indication that the gesture occurred along with the maximum arm velocity of the user, and then the application may use internal logic to determine how fast the corresponding pitcher should throw the pitch.

Optional operation 810 depicts receiving from the first application a value for at least one parameter, and where determining from the base information about the gesture and each parameter a confidence level includes determining from the value of the parameter a confidence level. A parameter may comprise any of a wide variety of characteristics of a gesture, such as a body part, a volume of space, a velocity, a direction of movement, an angle, and a place where a movement occurs.

In an embodiment, the value of the parameter is determined by an end user of the application through making a gesture. For instance, an application may allow the user to train it, so that the user is able to specify what motions he believes a gesture should comprise. This may be beneficial to allow a user without good control over his motor skills to be able to link what motions he can make with a corresponding gesture. If this were not available, the user may become frustrated because he is unable to make his body move in the manner required by the application to produce the gesture.

In an embodiment where there exist complimentary gestures—a plurality of gestures that have inter-related parameters—receiving from the application a value for a parameter may include both setting the parameter with the value, and setting a complimentary parameter of a complimentary gesture based on the value. For example, one may decide that a user who throws a football in a certain manner is likely to also throw a baseball in a certain manner. So, where it is determined that a certain parameter should be set in a particular manner, other complimentary parameters may be set based on how that first parameter is set.

This need not be the same value for a given parameter, or even the same type of parameter across gestures. For instance, it could be that when a football throw must be made with a forward arm velocity of X m/s, then a football catch must be made with the hands at least distance Y m away from the torso.

Operation 812 depicts the optional operation of receiving from the second application a second value for at least one parameter of a second filter representing the gesture, the second filter comprising the base information about the gesture, the second value differing from the value received from the first application; receiving second data captured by a camera; applying the second filter to the second data and determining from the base information about the gesture and each parameter of the second filter a confidence level that the second data is indicative of the gesture being performed; and sending the second application the confidence level.

Each application, or context within an application, may specify its own parameter for a single gesture, and the gesture recognizer 190 will be responsive to the particulars of each application. For instance, one first-person shooter may require a demonstrative gun firing gesture, because ammunition is limited or secrecy plays a major role in the game, and firing a gun produces a loud noise. However, a second first-person shooter may allow for a much smaller motion for firing a gun, because a demonstrative motion runs too close to what that game has defined for a punching motion.

Optional operation 814 depicts optional operations—wherein receiving from the application a value for a parameter includes setting the parameter with the value, and receiving data captured by the capture device includes receiving data from a first user—of setting the parameter with a second value in response to receiving data captured by the capture device indicative of one selected from the group consisting of an increase in the first user's fatigue, an increase in the first user's competence, and a second user replacing the first user.

The motions or poses that a user makes to convey a gesture may change over time, and this may create a change in context. For instance, the user may become fatigued and no longer jump as high as he did at the start of his session to convey a jump gesture. Also, the user may through practice become better at making the motion or pose associated with a gesture, so the acceptable variations for a parameter may be decreased so that two different gestures are less likely to be recognized by one set of motions or pose. The application may also wish to give the user a more challenging experience as he becomes more adroit, so as not to lose his attention. In another embodiment, the application may give the user finer control over the gestures or more gestures to use. For instance, a beginner at a tennis video game may only be concerned with hitting the ball over the net, and not with putting any spin on it. However, as the tennis application detects that the user is improving, it may introduce or recognize gestures for top-spin or back-spin in addition to the standard hit.

Also, a second user may replace the first user as the one providing input and the second user may have drastically different ways of conveying gestures. In an embodiment, the received depth images may be parsed to determine that a second user is in the scene conveying the gestures. In an embodiment, there may be a reserved gesture that the user may utilize to indicate this to the application. Also, the recognizer engine may determine the presence of the second user through a change in the motions or poses made to convey gestures.

When these changes have been determined, they may each be treated like a change in context, and parameters may be changed correspondingly to account for this.

Operation 816 depicts the optional operation of changing the context; receiving a second data captured by the camera indicative of the user's first gesture being performed; determining from the second data that a confidence level that a second gesture represented by a second filter is being performed is greater than the confidence level from the second data that the represented by the filter is being performed.

In different contexts, one motion or pose by a user may be correspond to different gestures. For instance, in a fighting game, while in the fighting mode of the game, the user may cross his forearms in front of his torso. In this fighting context, that may correspond to a "block attack" gesture. However, if the user pauses the game and enters a menu screen, this menu screen comprises a different context. In this menu screen context, that same crossed forearms may correspond to a "exit menu screen" gesture.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for providing recognition of gestures made by a user using a gesture filter representing a gesture, comprising:
   receiving information indicative of a user motion or pose, the information being captured by a camera;
   determining from the information that the information is further indicative of a change in the user's fatigue, a change in the user's competence, or a second user replacing the user, and in response, modifying a parameter of the gesture filter;
   determining an output of the modified gesture filter based on the information; and
   sending the output to an application.

2. The method of claim 1, further comprising:
   receiving second information indicative of a user motion or pose, the second information being captured by the camera;
   determining a second output of the gesture filter based on the second information; and
   sending the application the second output.

3. The method of claim 1, further comprising:
   receiving second information indicative of sound captured by a microphone; and
   sending an indication of the second information to the application.

4. The method of claim 1, wherein the gesture filter has a plurality of contexts, and a parameter of each context of the base information about the gesture is unique.

5. The method of claim 1, wherein the gesture filter comprises a second parameter, and further comprising:
   in response to receiving second information indicative of a user motion or pose, the information being captured by the camera, receiving from the application a value for the second parameter; and
   wherein determining an output of the modified gesture filter based on the information further comprises:
      determining an output of the modified gesture filter based on the value for the second parameter.

6. The method of claim 1, wherein determining the output of the modified gesture filter based on the information further comprises:
   determine a confidence level that the information is indicative of the gesture being performed.

7. The method of claim 1, wherein the gesture comprises:
   a crouch, a jump, a lean, an arm throw, a toss, a swing, a dodge, a kick, or a block.

8. The method of claim 1, wherein a gesture filter comprises a type of input and a type of output, and further comprising:
   replacing the gesture filter with a second filter, the second filter having the same type of input and type of output as the gesture filter,
   receiving second information captured by a camera;
   determining a second output of the second filter based on the second information; and
   sending the application the second output.

9. The method of claim 1, wherein sending the output to the application comprises:
   sending the output to the application and a second application.

10. A system for providing recognition of gestures made by a user using a gesture filter representing a gesture comprising:
    a processor; and
    a memory communicatively coupled to the processor when the system is operational, the memory bearing processor-executable instructions that, when executed by the processor, cause the system at least to:
       receive information indicative of a user motion or pose, the information being captured by a camera;
       determine from the information that the information is further indicative of a change in the user's fatigue, a change in the user's competence, or a second user replacing the user, and in response, modifying a parameter of the gesture filter;
       determine an output of the modified gesture filter based on the information; and
       send the output to an application.

11. The system of claim 10, wherein the gesture filter has a plurality of contexts, and a parameter of each context of the base information about the gesture is unique.

12. The system of claim 10, wherein the memory further bears processor-executable instructions that, when executed by the processor, cause the system to at least:
    receive the gesture filter from the application.

13. The system of claim 10, wherein the gesture filter comprises a second parameter, and wherein the memory further bears processor-executable instructions that, when executed by the processor, cause the system at least to:
    in response to receiving second information indicative of a user motion or pose, the information being captured by the camera, receive from the application a value for the second parameter; and
    wherein the processor-executable instructions that, when executed by the system, cause the system to at least determine an output of the modified gesture filter based on the information further cause the system to at least:
       determine an output of the modified gesture filter based on the value for the parameter.

14. The system of claim 10, wherein processor-executable instructions that, when executed by the processor, cause the system at least to determine the output of the gesture filter based on the information further causes the system at least to:
    determine a confidence level that the information is indicative of the gesture being performed.

15. The system of claim 10, wherein the gesture comprises: a crouch, a jump, a lean, an arm throw, a toss, a swing, a dodge, a kick, or a block.

16. The system of claim 10, wherein a gesture filter comprises a type of input and a type of output, and wherein the memory further bears processor-executable instructions that, when executed by the processor, cause the system at least to:
   replace the gesture filter with a second filter, the second filter having the same type of input and type of output as the gesture filter,
   receive second information captured by a camera;
   determine a second output of the second filter based on the second information; and
   send the application the second output.

17. The system of claim 10, wherein the memory further bears processor-executable instructions that, when executed by the processor, cause the system at least to:
   receive sound information; and
   wherein the processor-executable instructions that, when executed by the system, cause the system to at least determine an output of the second gesture filter based on the information further cause the system to at least:
   determining the output of the second gesture filter based on the sound information.

18. The system of claim 10, wherein processor-executable instructions that, when executed by the processor, cause the system at least to send the output to the application further causes the system at least to:
   send the output to the application and a second application.

19. A computer-readable storage medium for providing recognition of gestures made by a user using a gesture filter representing a gesture bearing computer-readable instructions that, when executed on a computer, cause the computer to perform operations comprising:
   receiving data indicative of a user motion or pose, the data being captured by a camera;
   determine from the information that the information is further indicative of a change in the user's fatigue, a change in the user's competence, or a second user replacing the user, and in response, modifying a parameter of the gesture filter;
   determine an output of the modified gesture filter based on the information; and
   sending the output to an application.

20. The computer-readable storage medium of claim 19, wherein sending the output to the application comprises:
   sending the output to the application and a second application.

* * * * *